(12) United States Patent
Wang et al.

(10) Patent No.: US 10,742,131 B2
(45) Date of Patent: Aug. 11, 2020

(54) MEDIUM-HIGH VOLTAGE ENERGY CONVERSION SYSTEM, AND CONTROL METHOD AND CONTROLLER THEREFOR

(71) Applicant: SUNGROW (SHANGHAI) CO., LTD., Shanghai (CN)

(72) Inventors: Xinyu Wang, Shanghai (CN); Jun Xu, Shanghai (CN); Jiacai Zhuang, Shanghai (CN); Yuqing Cui, Shanghai (CN); Tengfei Wang, Shanghai (CN)

(73) Assignee: SUNGROW (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/527,628

(22) Filed: Jul. 31, 2019

(65) Prior Publication Data

US 2020/0177091 A1    Jun. 4, 2020

(30) Foreign Application Priority Data

Nov. 30, 2018    (CN) .......................... 2018 1 1454561

(51) Int. Cl.
*H02M 3/34*      (2006.01)
*H02M 1/00*      (2006.01)

(52) U.S. Cl.
CPC ...... *H02M 3/34* (2013.01); *H02M 2001/0006* (2013.01); *H02M 2001/0009* (2013.01)

(58) Field of Classification Search
CPC ............... H02M 3/07; H02M 3/33569; H02M 3/33584; H02M 3/34; H02M 7/487; H02M 7/49; H02M 7/5387; H02M 1/08; H02M 2007/4815; H02M 2001/0003; H02M 2001/0006; H02M 2001/0009; H02M 2001/007; H02M 2001/0077;
(Continued)

(56) References Cited

U.S. PATENT DOCUMENTS 6,369,462 B1 * 4/2002 Siri .......................... G05F 1/67
                                                        307/51
9,130,401 B2 * 9/2015 Adest ................ H01L 31/02021
(Continued)

FOREIGN PATENT DOCUMENTS

| CN | 104539187 A | 4/2015 |
|---|---|---|
| CN | 108631357 A | 10/2018 |
| WO | 2015103907 A1 | 7/2015 |

OTHER PUBLICATIONS

Extended European Search Report corresponding to Application No. 19188217.4-1202; dated Nov. 4, 2019.

*Primary Examiner* — Yemane Mehari
(74) *Attorney, Agent, or Firm* — Cantor Colburn LLP (57) ABSTRACT

A medium-high voltage energy conversion system, and a control method and a controller therefor are provided. In the control method, an operation state of the medium-high voltage energy conversion system is acquired. In a case that the system is in a normal operation state, the system is controlled to operate in a first direct circuit current source mode. In a case that the system is in a first fault state in which a direct current grid voltage drops, the system is controlled to operate in a direct current voltage source mode. In a case that the system is in a second fault state in which a direct current grid voltage is in an overvoltage state, the system is controlled to operate in a second direct circuit current source mode.

8 Claims, 9 Drawing Sheets

(58) Field of Classification Search
CPC ... Y02B 70/1433; Y02B 70/1441; H02J 3/01; H02J 3/1814; H02J 3/383; H02J 3/385
USPC .................................... 363/12–20; 307/82
See application file for complete search history.

(56) References Cited

U.S. PATENT DOCUMENTS

| | | | |
|---|---|---|---|
| 2008/0150366 A1* | 6/2008 | Adest | H02M 3/1582 307/77 |
| 2011/0140649 A1* | 6/2011 | Choi | H01M 14/005 320/101 |
| 2013/0187473 A1* | 7/2013 | Deboy | H02M 7/49 307/82 |
| 2017/0294852 A1* | 10/2017 | Correa Vasques | H02M 1/44 |
| 2017/0358926 A1* | 12/2017 | Zhuo | H02M 3/33569 |
| 2019/0305560 A1* | 10/2019 | Wang | H02M 3/33569 |

\* cited by examiner

FIG. 1

(PRIOR ART)

FIG. 2

(PRIOR ART)

MEDIUM-HIGH VOLTAGE ENERGY CONVERSION SYSTEM, AND CONTROL METHOD AND CONTROLLER THEREFOR

CROSS-REFERENCE TO RELATED APPLICATION

The present application claims priority under 35 U.S.C. § 119 to Chinese Patent Application No. 201811454561.3, filed on Nov. 30, 2018, the content of which is incorporated herein by reference.

FIELD

The present disclosure relates to the technical field of power electronic transformers, and in particular to a medium-high voltage energy conversion system, and a control method and a controller therefor.

BACKGROUND

Figure 1:
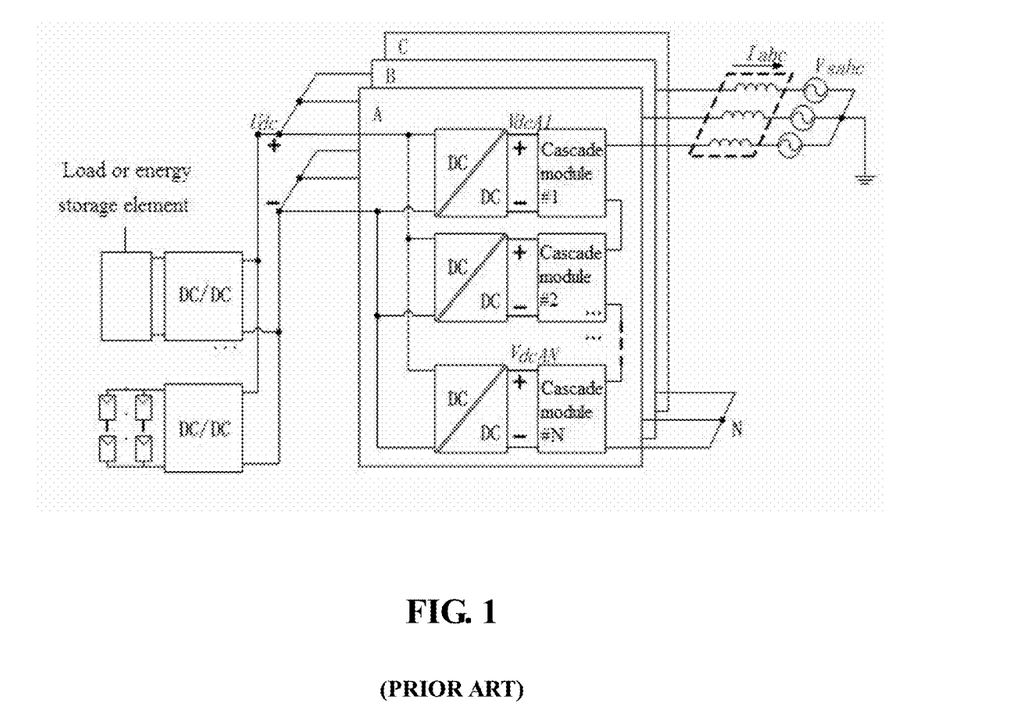
FIG. 1 is a schematic diagram showing a power electronic transformer in the conventional technology.

A medium-high voltage energy conversion system (such as a power electronic transformer, a solid state transformer and an energy router) is a device that directly transfers electrical energy from a low voltage into a medium-high voltage. A conventional power electronic transformer is shown in FIG. 1. An input end of the power electronic transformer is connected to a low voltage common direct current bus, to control a voltage at a low voltage common direct current bus input port constant. In this case, the power electronic transformer operates in a direct current voltage source mode.

In the direct current voltage source mode, the power electronic transformer is required to have a sufficient power capacity and a high dynamic response speed, so as to provide support for a low-voltage-side device that is connected to the low voltage common direct current bus, such as a load, a new energy device, an energy storage element. An insufficient power capacity or a low dynamic response speed may result in a fluctuation of the direct current voltage. In the case of the large fluctuation, the undervoltage or overvoltage protection mechanism of the low-voltage-side device may be triggered, which can even result in burnout of the low-voltage-side device.

Figure 2:
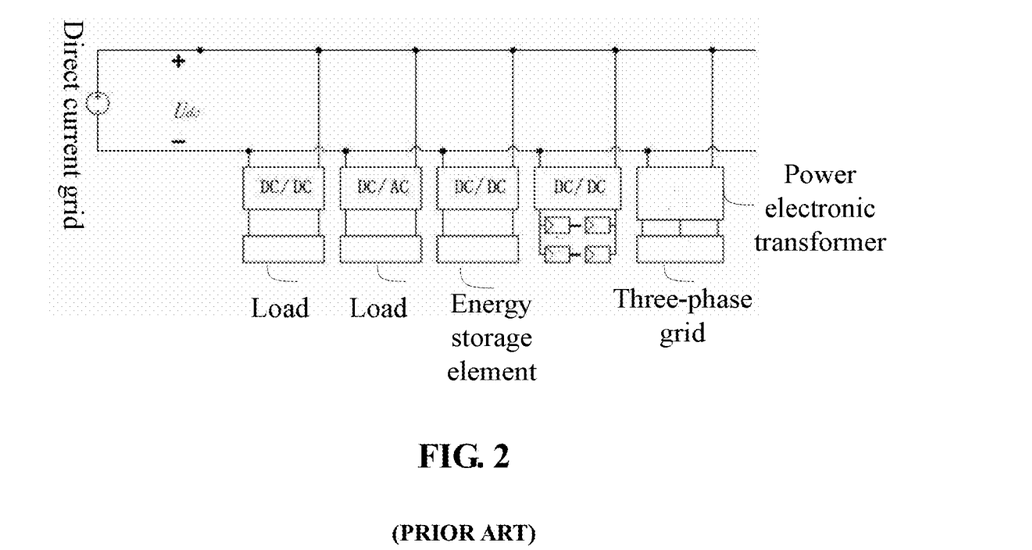
FIG. 2 is a schematic diagram showing another power electronic transformer in the conventional technology.

In addition, a conventional power electronic transformer may also be shown in FIG. 2, which operates in a direct circuit current source mode. In the direct circuit current source mode, if a fault occurs in a direct current microgrid or grid (for example, a grid voltage drops or dips), the power electronic transformer cannot effectively provide support for the direct current microgrid or grid.

Therefore, it is desired to provide a control method for a medium-high voltage energy conversion system, such that the power electronic transformer can provide support for the direct current microgrid or grid in a case that a fault occurs in the direct current microgrid or grid.

SUMMARY

A control method for a medium-high voltage energy conversion system is provided in the present disclosure, such that a power electronic transformer can provide support for a direct current microgrid or grid in a case that a fault occurs in the direct current microgrid or grid.

The following technical solutions are provided in the present disclosure.

The control method provided in the present disclosure is applied to a medium-high voltage energy conversion system including a direct current-direct current (DC/DC) isolation circuit and a grid-connected circuit. The control method includes:

acquiring an operation state of the medium-high voltage energy conversion system, where the operation state includes a normal operation state and a fault state, and the fault state includes a first fault state in which a direct current grid voltage drops and a second fault state in which a direct current grid voltage is in an overvoltage state;

controlling the medium-high voltage energy conversion system to operate in a first direct circuit current source mode in a case that the medium-high voltage energy conversion system is in the normal operation state;

controlling the medium-high voltage energy conversion system to operate in a direct current voltage source mode in a case that the medium-high voltage energy conversion system is in the first fault state; and controlling the medium-high voltage energy conversion system to operate in a second direct circuit current source mode in a case that the medium-high voltage energy conversion system is in the second fault state.

In an embodiment, the acquiring an operation state of the medium-high voltage energy conversion system includes:

acquiring a direct current voltage at a direct current input port;

determining that the medium-high voltage energy conversion system is in the first fault state, in a case that the direct current voltage is less than a first preset voltage threshold;

determining that the medium-high voltage energy conversion system is in the normal operation state, in a case that the direct current voltage is greater than or equal to the first preset voltage threshold and is less than or equal to a second preset voltage threshold; and determining that the medium-high voltage energy conversion system is in the second fault state, in a case that the direct current voltage is greater than the second preset voltage threshold.

In an embodiment, in a case that the medium-high voltage energy conversion system is in the normal operation state, an output voltage of the DC/DC isolation circuit is controlled to be equal to a first preset value, and the grid-connected circuit is controlled to operate in a constant current mode or a constant power mode;

in a case that the medium-high voltage energy conversion system is in the first fault state, the direct current voltage at the direct current input port is controlled, the output voltage of the DC/DC isolation circuit is controlled to be equal to a second preset value, and a sum of input voltages of the grid-connected circuit is controlled to be 3N times the second preset value, where N is the number of cascade modules of each phase in the grid-connected circuit; and in a case that the medium-high voltage energy conversion system is in the second fault state, the output voltage of the DC/DC isolation circuit is controlled to be equal to a third preset value, and the grid-connected circuit is controlled to operate in a constant current mode or a constant power mode.

In an embodiment, after controlling the medium-high voltage energy conversion system to operate in the direct current voltage source mode, the control method further includes:

acquiring a present direct current voltage at the direct current input port;

switching the medium-high voltage energy conversion system to the second direct circuit current source mode, in a case that the present direct current voltage is greater than the second preset voltage threshold;

switching the medium-high voltage energy conversion system to the first direct circuit current source mode, in a case that the present direct current voltage is greater than or equal to the first preset voltage threshold and is less than or equal to the second preset voltage threshold for a first preset time period; and controlling the medium-high voltage energy conversion system to be shut down, in a case that the present direct current voltage is less than the first preset voltage threshold for a second preset time period.

A controller for a medium-high voltage energy conversion system is further provided in the present disclosure. The medium-high voltage energy conversion system includes a direct current-direct current isolation circuit and a grid-connected circuit. The controller includes: a first acquiring module, a first control module, a second control module, and a third control module, where the first acquiring module is configured to acquire an operation state of the medium-high voltage energy conversion system, where the operation state includes a normal operation state and a fault state, and the fault state includes a first fault state in which a direct current grid voltage drops and a second fault state in which a direct current grid voltage is in an overvoltage state;

the first control module is configured to: control the medium-high voltage energy conversion system to operate in a first direct circuit current source mode in a case that the medium-high voltage energy conversion system is in the normal operation state;

the second control module is configured to: control the medium-high voltage energy conversion system to operate in a direct current voltage source mode in a case that the medium-high voltage energy conversion system is in the first fault state; and the third control module is configured to: control the medium-high voltage energy conversion system to operate in a second direct circuit current source mode in a case that the medium-high voltage energy conversion system is in the second fault state.

In an embodiment, the first acquiring module includes a first acquiring unit, a first determining unit, a second determining unit and a third determining unit, where the first acquiring unit is configured to acquire a direct current voltage at a direct current input port;

the first determining unit is configured to: determine that the medium-high voltage energy conversion system is in the first fault state, in a case that the direct current voltage is less than a first preset voltage threshold;

The second determining unit is configured to: determine that the medium-high voltage energy conversion system is in the normal operation state, in a case that the direct current voltage is greater than or equal to the first preset voltage threshold and is less than or equal to a second preset voltage threshold; and the third determining unit is configured to: determine that the medium-high voltage energy conversion system is in the second fault state, in a case that the direct current voltage is greater than the second preset voltage threshold.

In an embodiment, the first control module is further configured to: in a case that the medium-high voltage energy conversion system is in the normal operation state, control an output voltage of the DC/DC isolation circuit to be equal to a first preset value and control the grid-connected circuit to operate in a constant current mode or a constant power mode;

the second control module is further configured to: in a case that the medium-high voltage energy conversion system is in the first fault state, control the direct current voltage at the direct current input port, control the output voltage of the DC/DC isolation circuit to be equal to a second preset value, and control a sum of input voltages of the grid-connected circuit to be 3N times the second preset value, where N is the number of cascade modules of each phase in the grid-connected circuit; and the third control module is further configured to: in a case that the medium-high voltage energy conversion system is in the second fault state, control the output voltage of the DC/DC isolation circuit to be equal to a third preset value and control the grid-connected circuit to operate in a constant current mode or a constant power mode.

In an embodiment, the controller further includes: a second acquiring module, a fourth control module, a fifth control module and a sixth control module, where the second acquiring module is configured to acquire a present direct current voltage at the direct current input port;

the fourth control module is configured to: switch the medium-high voltage energy conversion system to the second direct circuit current source mode, in a case that the present direct current voltage is greater than the second preset voltage threshold;

the fifth control module is configured to: switch the medium-high voltage energy conversion system to the first direct circuit current source mode, in a case that the present direct current voltage is greater than or equal to the first preset voltage threshold and is less than or equal to the second preset voltage threshold for a first preset time period; and the sixth control module is configured to: control the medium-high voltage energy conversion system to be shut down, in a case that the present direct current voltage is less than the first preset voltage threshold for a second preset time period.

A medium-high voltage energy conversion system is further provided in the present disclosure. The medium-high voltage energy conversion system includes a DC/DC isolation circuit and a grid-connected circuit, the DC/DC isolation circuit includes multiple DC/DC converters, and the grid-connected circuit includes multiple cascade modules and an alternating current grid-connected filter, where input ends of the plurality of DC/DC converters are connected in parallel with each other and are each connected to an input end of a direct current grid; and an output end of each of the plurality of DC/DC converters is connected in parallel with an input end of one of the plurality of cascade modules, and alternating current output ends of the plurality of cascade modules are connected in series with each other and are connected to an input end of an alternating current grid via the alternating current grid-connected filter.

In an embodiment, each of the multiple DC/DC converters is an LC series resonant converter, an LLC series resonant converter, a dual active DC/DC converter, a full-bridge DC/DC converter, a power bidirectional LC series resonant converter, or a power bidirectional LLC series resonant converter, and each of the multiple cascade modules is a direct current-alternating current (DC/AC) converter.

A control method for a medium-high voltage energy conversion system is provided in the present disclosure. In the control method, the operation state of the medium-high voltage energy conversion system is acquired. In a case that the medium-high voltage energy conversion system is in the normal operation state, the medium-high voltage energy conversion system is controlled to operate in the first direct circuit current source mode. In a case that the medium-high voltage energy conversion system is in the first fault state, the medium-high voltage energy conversion system is controlled to operate in the direct current voltage source mode. In a case that the medium-high voltage energy conversion system is in the second fault state, the medium-high voltage energy conversion system is controlled to operate in the second direct circuit current source mode. It can be seen that, in a case that the medium-high voltage energy conversion system provided in the present disclosure is in the normal operation state, the medium-high voltage energy conversion system operates in a direct circuit current source mode and is grid-connected to a direct current grid. In a case that a fault occurs in the medium-high voltage energy conversion system, the medium-high voltage energy conversion system operates in a direct current voltage source mode to provide support for direct current microgrid or grid.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

To make the above objects, features and advantages of the present disclosure to be clear and easily understood, specific embodiments of the present disclosure are described in detail below with reference to the drawings.

Figure 3:
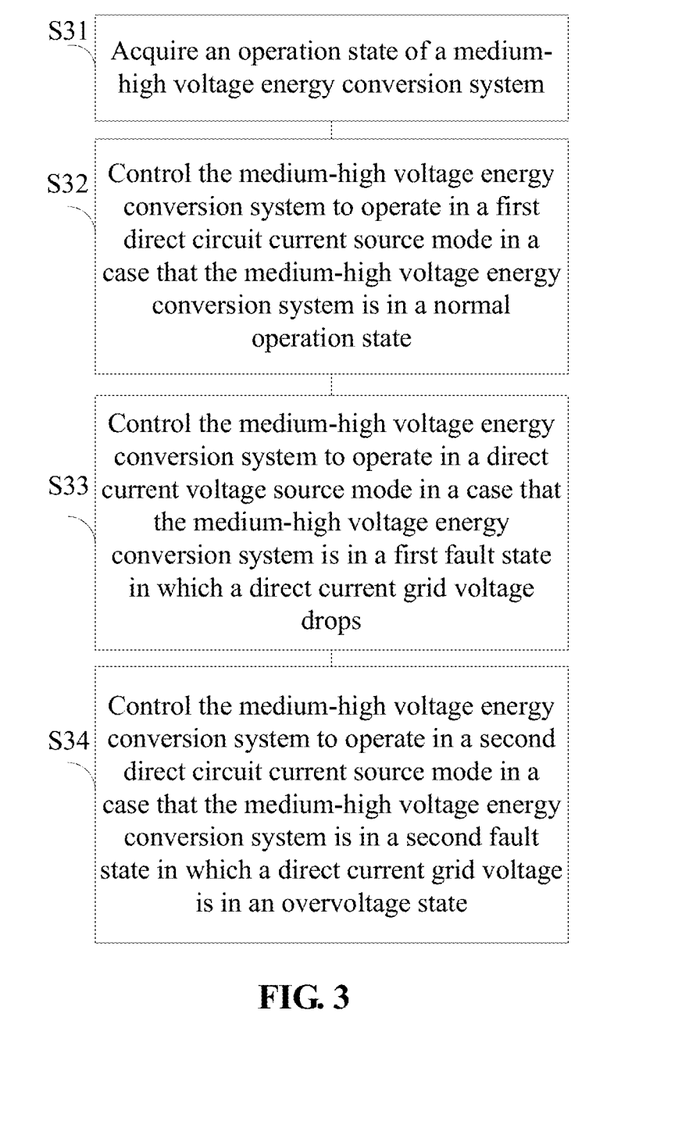
FIG. 3 is a flowchart showing a control method for a medium-high voltage energy conversion system according to an embodiment of the present disclosure.

As shown in FIG. 3, a control method for a medium-high voltage energy conversion system is provided according to an embodiment of the present disclosure. In a case that the medium-high voltage energy conversion system is in a normal operation state, the medium-high voltage energy conversion system operates in a direct circuit current source mode and is grid-connected to a direct current grid. In a case that a fault occurs in the medium-high voltage energy conversion system, the medium-high voltage energy conversion system operates in a direct current voltage source mode to provide support for direct current microgrid or grid.

Figure 4:
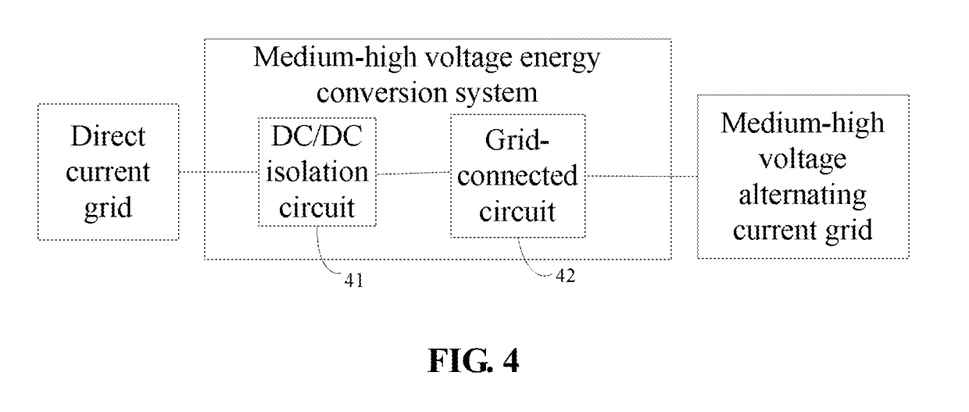
FIG. 4 is a schematic structural diagram showing a medium-high voltage energy conversion system according to an embodiment of the present disclosure.
Figure 5:
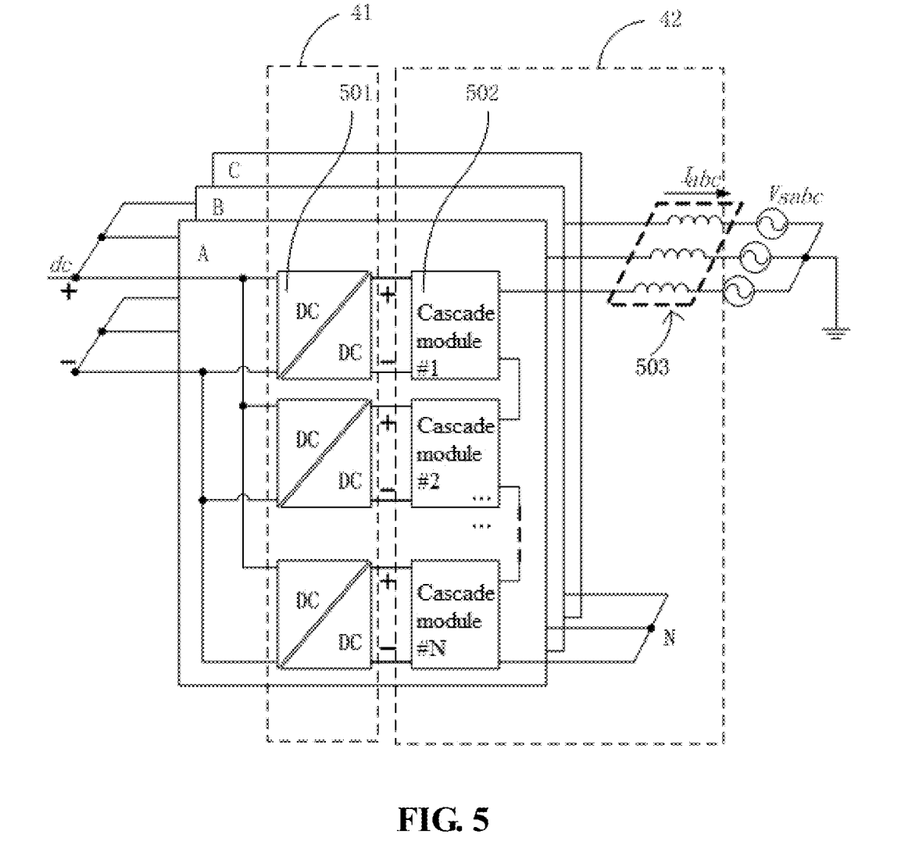
FIG. 5 is a schematic structural diagram showing a medium-high voltage energy conversion system according to another embodiment of the present disclosure.
Figure 6A:
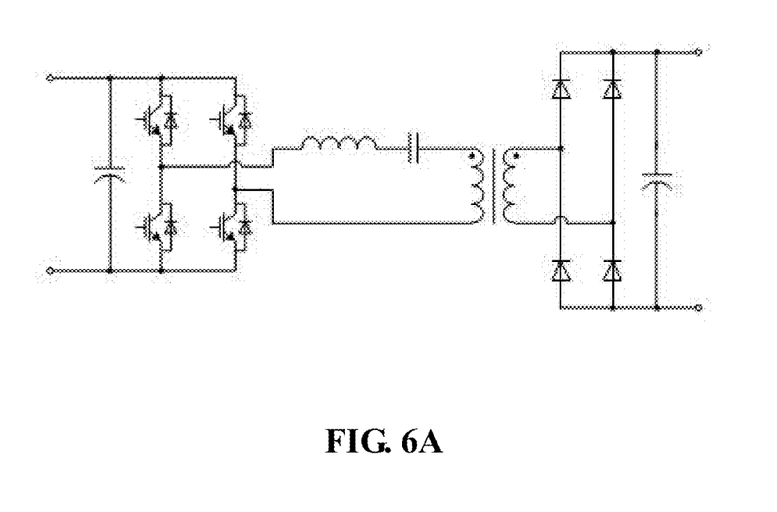
FIG. 6A to FIG. 6D schematically show specific structures of a DC/DC converter provided in the present disclosure.
Figure 6B:
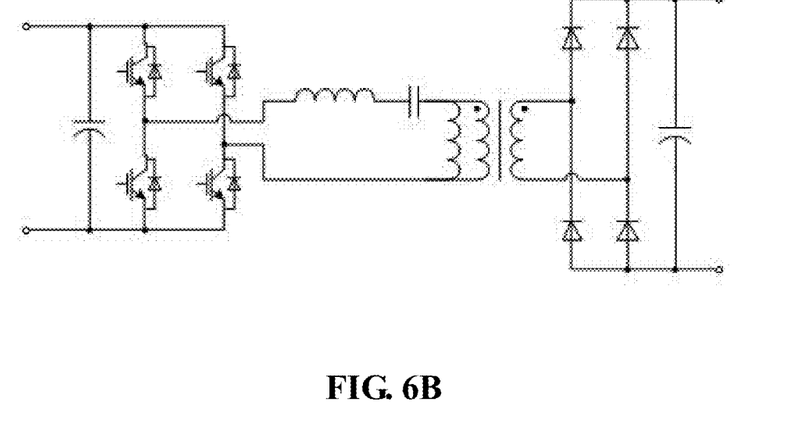
Figure 6C:
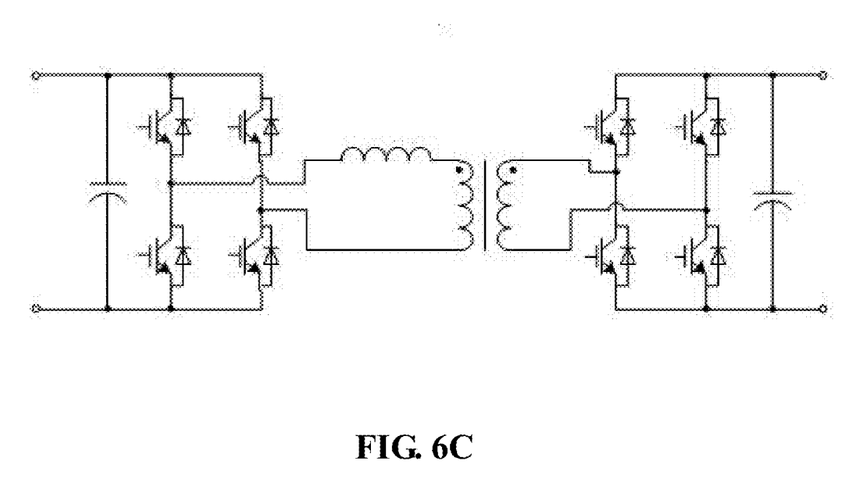
Figure 6D:
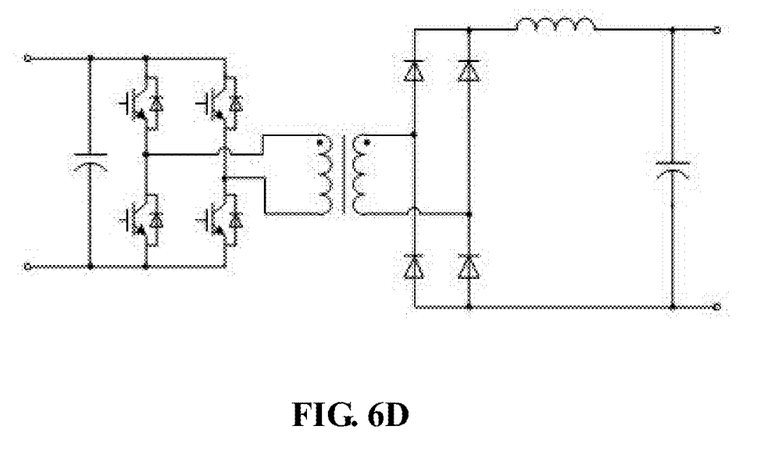

In this embodiment, as shown in FIG. 4, the medium-high voltage energy conversion system includes a DC/DC isolation circuit 41 and a grid-connected circuit 42. As shown in FIG. 5, the DC/DC isolation circuit 41 includes multiple DC/DC converters 501. The grid-connected circuit 42 includes multiple cascade modules 502 and an alternating current grid-connected filter 503.

Input ends of the multiple DC/DC converters 501 are connected in parallel with each other, and are each connected to an input end Udc of the direct current grid. An output end of each of the multiple DC/DC converters 501 is connected in parallel with an input end of one of the multiple cascade modules 502. Alternating current output ends of the multiple cascade modules 502 are connected in series with each other and are connected to an input end of an alternating current grid via the alternating current grid-connected filter 503.

It should be noted that, in this embodiment, one phase of output is formed by cascading alternating current output ends of the multiple cascade modules. Three phases of output are grid-connected to the alternating current grid via the grid-connected filter in a star or delta configuration.

Figure 7:
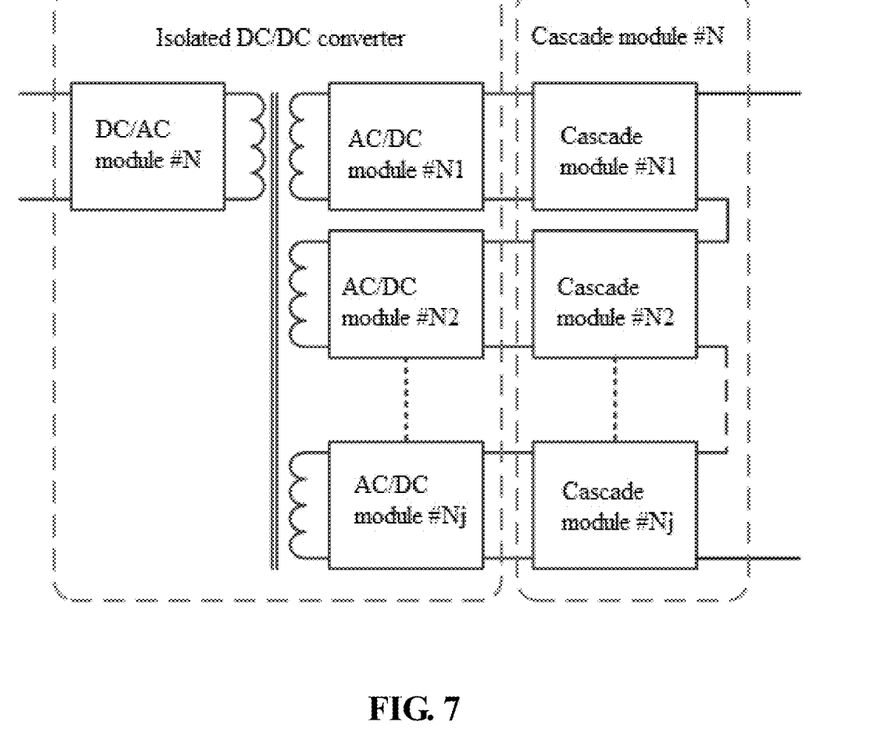
FIG. 7 is a schematic structural diagram showing a multi-winding single-input multiple-output DC/DC converter according to an embodiment of the present disclosure.
Figure 8:
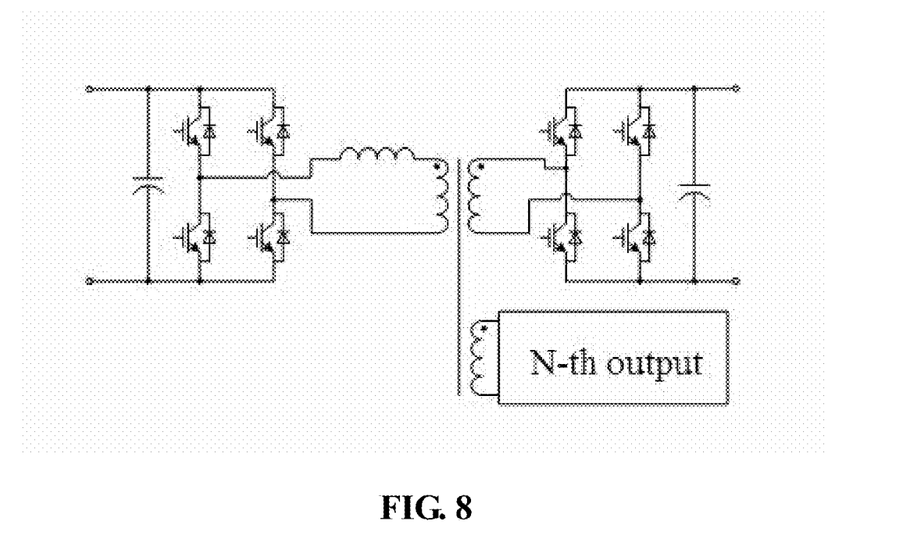
FIG. 8 is a schematic structural diagram showing a multi-winding single-input multiple-output DC/DC converter according to another embodiment of the present disclosure.

Based on the above embodiments, as shown in FIG. 6A to FIG. 6D, each of the multiple DC/DC converters in this embodiment may be an LC series resonant converter, an LLC series resonant converter, a dual active DC/DC converter, a full-bridge DC/DC converter, a power bidirectional LC series resonant converter, or a power bidirectional LLC series resonant converter. Further, in this embodiment, as shown in FIG. 7 and FIG. 8, each of the multiple DC/DC converters may be implemented by a multi-winding single-input multiple-output structure, where multiple output ports are connected in series to form an overall output.

Each of the multiple cascade modules may be a DC/AC converter, which may be in but not limited to a full-bridge topology, a neutral point clamped (NPC) full-bridge topology, a flying capacitor full-bridge topology.

Based on the above structures of the medium-high voltage energy conversion system, the control method for a medium-high voltage energy conversion system may include the following steps S31 to S34.

In S31, an operation state of the medium-high voltage energy conversion system is acquired.

In this embodiment, the operation state of the medium-high voltage energy conversion system refers to an operation state of a direct current grid detected by the medium-high voltage energy conversion system. The operation state includes a normal operation state and a fault state. The fault state includes a first fault state in which a direct current grid voltage drops and a second fault state in which a direct current grid voltage is in an overvoltage state.

In this embodiment, in the normal operation state, the direct current grid voltage, i.e., a direct current voltage Udc at an overall direct current input port detected by a system controller is greater than or equal to a first voltage threshold Uth1 and is less than or equal to a second voltage threshold Uth2, i.e., Uth1≤Udc≤Uth2. If a fault that the direct current grid voltage drops occurs, the direct current voltage Udc is less than the first voltage threshold Uth1, i.e., Udc<Uth1. If a fault that a high direct current grid voltage is in an overvoltage state occurs, the direct current voltage Udc is greater than the second voltage threshold Uth2, i.e., Uth2<Udc.

In this embodiment, it is assumed that a rated direct current grid voltage is 400V, and the direct current grid voltage may have a fluctuation ranging from −10% to +10%. In this case, the first voltage threshold Uth1 may be set as 360V, i.e., Uth1=360V, and the second voltage threshold Uth2 may be set as 440V, i.e., Uth2=440V. If the direct current voltage Udc at the overall direct current input port detected by the system controller is less than 360V, i.e., Udc<360V, the system may determine that the fault that the direct current grid voltage drops occurs. If the direct current voltage Udc at the overall direct current input port detected by the system controller is greater than 440V, i.e., Udc>440V, the system may determine that the fault that a high direct current grid voltage is in an overvoltage state occurs.

In S32, in a case that the medium-high voltage energy conversion system is in the normal operation state, the medium-high voltage energy conversion system is controlled to operate in a first direct circuit current source mode.

In S33, in a case that the medium-high voltage energy conversion system is in the first fault state, the medium-high voltage energy conversion system is controlled to operate in a direct current voltage source mode.

In S34, in a case that the medium-high voltage energy conversion system is in the second fault state, the medium-high voltage energy conversion system is controlled to operate in a second direct circuit current source mode.

It can be seen that, in the case that the medium-high voltage energy conversion system provided in the present disclosure is in the normal operation state, the medium-high voltage energy conversion system, as a direct circuit current source, is grid-connected to the direct current grid. In the case that the medium-high voltage energy conversion system is in the first fault state, the medium-high voltage energy conversion system, as a direct current voltage source, provides support for the direct current microgrid or grid.

Figure 9:
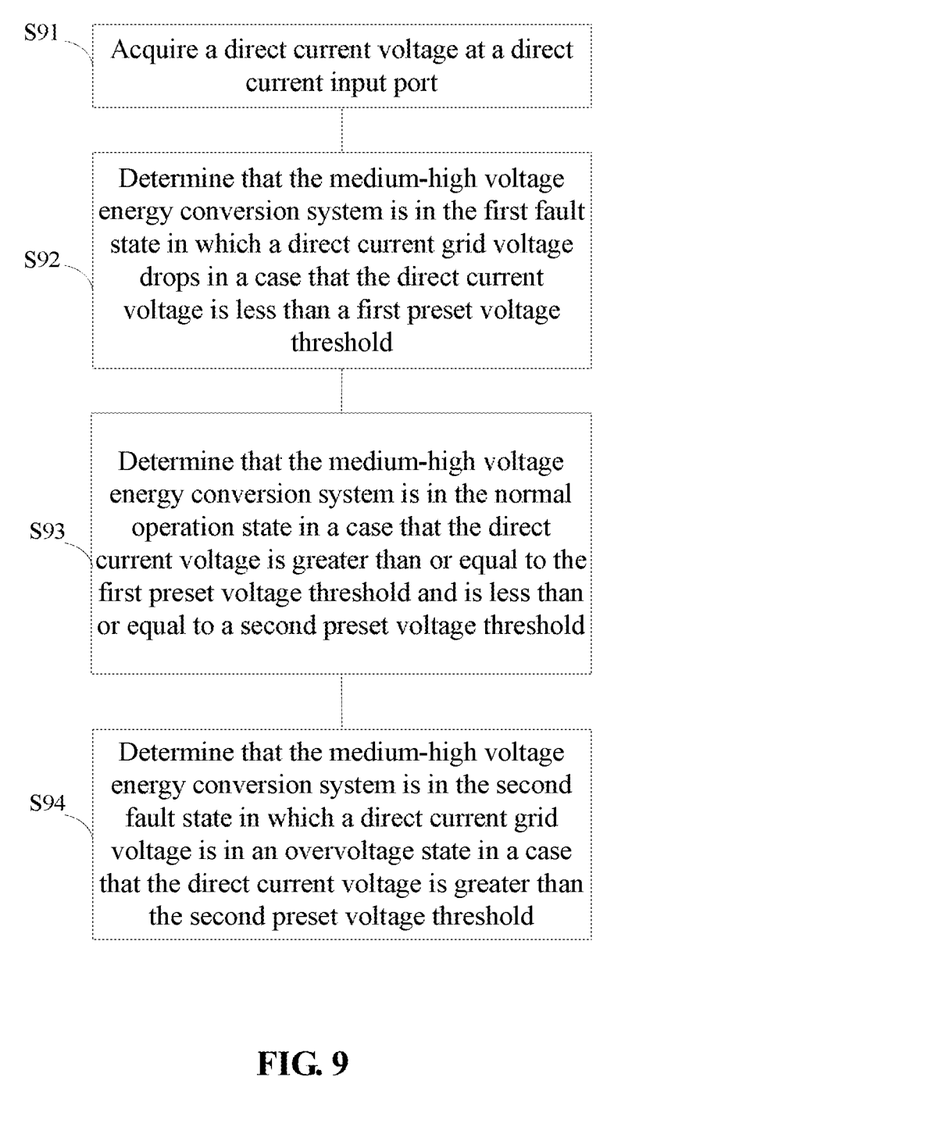
FIG. 9 is a flowchart showing specific processes in the control method for a medium-high voltage energy conversion system according to the embodiment of the present disclosure.

Based on the above, as shown in FIG. 9, the process of acquiring the operation state of the medium-high voltage energy conversion system may be performed by the following steps S91 to S94.

In S91, a direct current voltage at a direct current input port is acquired.

In S92, in a case that the direct current voltage is less than a first preset voltage threshold, it is determined that the medium-high voltage energy conversion system is in the first fault state.

In S93, in a case that the direct current voltage is greater than or equal to the first preset voltage threshold and is less than or equal to a second preset voltage threshold, it is determined that the medium-high voltage energy conversion system is in the normal operation state.

In S94, in a case that the direct current voltage is greater than the second preset voltage threshold, it is determined that the medium-high voltage energy conversion system is in the second fault state.

Specifically, in a case that the medium-high voltage energy conversion system is in the normal operation state, an output voltage of the DC/DC isolation circuit is controlled to be equal to a first preset value, and the grid-connected circuit is controlled to operate in a constant current mode or a constant power mode.

In a case that the medium-high voltage energy conversion system is in the first fault state, the direct current voltage at the direct current input port is controlled, the output voltage of the DC/DC isolation circuit is controlled to be equal to a second preset value, and a sum of input voltages of the grid-connected circuit is controlled to be 3N times the second preset value, where N is the number of cascade modules of each phase in the grid-connected circuit.

In a case that the medium-high voltage energy conversion system is in the second fault state, the output voltage of the DC/DC isolation circuit is controlled to be equal to a third preset value, and the grid-connected circuit is controlled to operate in a constant current mode or a constant power mode.

Figure 10:
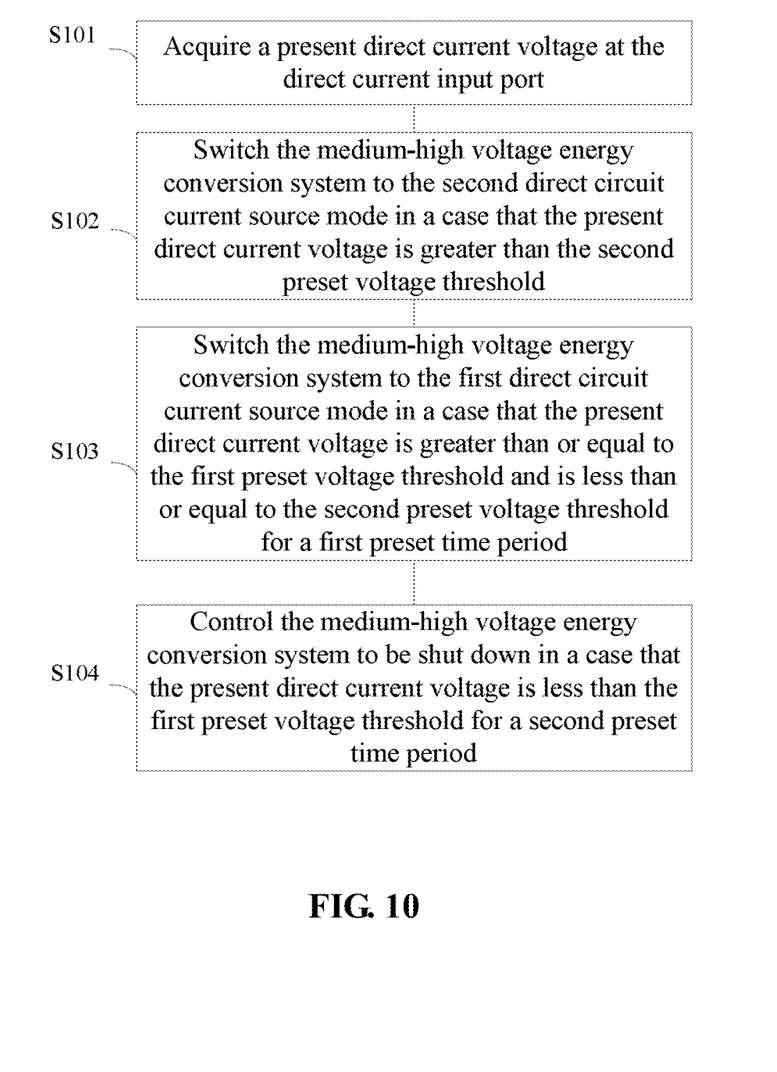
FIG. 10 is a flowchart showing specific processes in the control method for a medium-high voltage energy conversion system according to the embodiment of the present disclosure.

Based on the above, as shown in FIG. 10, after the process of controlling the medium-high voltage energy conversion system to operate in the direct current voltage source mode, the control method for a medium-high voltage energy conversion system further includes the following steps S101 to S104.

In S101, a present direct current voltage at the direct current input port is acquired.

In S102, in a case that the present direct current voltage is greater than the second preset voltage threshold, the medium-high voltage energy conversion system is switched to the second direct circuit current source mode.

In S103, in a case that the present direct current voltage is greater than or equal to the first preset voltage threshold and is less than or equal to the second preset voltage threshold for a first preset time period, the medium-high voltage energy conversion system is switched to the first direct circuit current source mode.

In S104, in a case that the present direct current voltage is less than the first preset voltage threshold for a second preset time period, the medium-high voltage energy conversion system is controlled to be shut down.

Schematically, in this embodiment, the direct current voltage Udc at the overall direct current input port detected by the system controller of the medium-high voltage energy conversion system is acquired firstly, and the subsequent operation is then performed based on a comparison between the direct current voltage Udc, the first voltage threshold Uth1, and the second voltage threshold Uth2 (where the first voltage threshold Uth1 is less than the second voltage threshold Uth2, i.e., Uth1<Uth2).

In the case of Uth1≤Udc≤Uth2, it is determined that no fault occurs in the direct current grid voltage. In this case, the system controller controls the medium-high voltage energy conversion system to operate in the first direct circuit current source mode, to supply electric power to the direct current grid (where the statement "supplying electric power" may refer to a process in which the electric power flows from the alternating current grid to the direct current grid, or the electric power flows from the direct current grid to the alternating current grid, or no electric power flows between the direct current grid and the alternating current grid). The first direct circuit current source mode has the following features a) to d) in this system.

In feature a), the medium-high voltage energy conversion system does not control the direct current voltage at the overall direct current input port.

In feature b), open-loop control or closed-loop control may be performed on each of the multiple DC/DC converters, to control an output voltage of the DC/DC converter to be equal to a preset value Vdc1.

In feature c), a high voltage grid-connected stage is grid-connected to the alternating current grid in a constant current mode or a constant power mode. Specifically, a current instruction I1* is set as an active current loop instruction of the high voltage grid-connected stage. Alternatively, a power instruction P1* may be set, and an actual current instruction may be obtained by dividing the power instruction P1* by the grid voltage.

It should be noted that, in this embodiment, a direction in which energy or power flows from the alternating current grid to the direct current grid may be set as a positive direction, and in this case a direction opposite to the positive direction is set as a negative direction. Alternatively, a direction in which an alternating current of the high voltage grid-connected stage flows from the alternating current grid to a high voltage grid-connected stage converter may be set as a positive direction, and in this case a direction opposite to the positive direction is set as a negative direction.

In feature d), the comparison between the direct current voltage Udc at the overall direct current input port, the first voltage threshold Uth1, and the second voltage threshold Uth2 proceeds.

In the case of Udc<Uth1, it is determined that the fault that the direct current grid voltage drops occurs. In this case, the medium-high voltage energy conversion system is switched to operate in the direct current voltage source mode, to supply electric power to the direct current grid. The direct current voltage source mode has the following features a) to c) in this system.

In feature a), the medium-high voltage energy conversion system controls the direct current voltage at the overall direct current input port.

In feature b), open-loop control or closed-loop control may be performed on each of the multiple DC/DC converters, to control an output voltage of the DC/DC converter to be equal to a preset value Vdc2. The preset value Vdc2 may be a fixed value, or equal to the voltage at the overall input port, or equal to a product of the voltage at the overall input port and a proportionality factor k.

In feature c), the high voltage grid-connected stage controls a sum of direct current input voltages of all of the multiple DC/DC converters to be equal to 3N×Vdc2, or controls an average of the direct current input voltages to be equal to the preset value Vdc2, where N is the number of cascade modules of each phase in the grid-connected circuit. The 3N×Vdc2 and the Vdc2 are used as voltage loop instructions. Specifically, a difference between the above instruction and a feedback value is used as an input of a voltage loop regulator, and an output of the voltage loop regulator is used as an input of an active current loop.

In the case of Udc>Uth2, it is determined that the fault that a high direct current grid voltage is in an overvoltage state occurs. In this case, the system controller controls the medium-high voltage energy conversion system to operate in the second direct circuit current source mode, to supply electric power to the direct current grid. The electric power flowing from the alternating current grid to the direct current grid needs to be reduced compared with the case of Uth1≤Udc≤Uth2, and the second direct circuit current source mode has the following features a) to d) in this system.

In feature a), the medium-high voltage energy conversion system does not control the direct current voltage at the overall direct current input port.

In feature b), open-loop control or closed-loop control may be performed on each of the multiple DC/DC converters, to control an output voltage of the DC/DC converter to be equal to a preset value Vdc3.

In feature c), the high voltage grid-connected stage is grid-connected to the alternating current grid in a constant current mode or a constant power mode. Specifically, a current instruction I2* is set as an active current loop instruction of the high voltage grid-connected stage. Alternatively, a power instruction P2* may be set, and an actual current instruction may be obtained by dividing the power instruction P2* by the grid voltage. The process of reducing the electric power flowing from the alternating current grid to the direct current grid may be performed by decreasing the alternating current instruction (I2*−I1*<0) or the power instruction (P2*−P1*<0), or by stopping supplying the electric power to the direct current grid (the current instruction I2* or the power instruction P2* is set as zero), or by reversely supplying the electric power from the direct current grid to the alternating current grid (the current instruction or the power instruction is set to be negative).

In feature d), the comparison between the direct current voltage Udc at the overall direct current input port, the first voltage threshold Uth1, and the second voltage threshold Uth2 proceeds.

After the process of controlling the medium-high voltage energy conversion system to operate in the direct current voltage source mode, the system controller detects the direct current voltage at the overall direct current input port.

If it is detected that the direct current voltage Udc is greater than the second voltage threshold Uth2, i.e., Udc>Uth2, the system controller determines that the medium-high voltage energy conversion system operates in the second direct circuit current source mode.

If it is detected that the direct current voltage Udc is greater than or equal to the first voltage threshold Uth1 and is less than or equal to the second voltage threshold Uth2, i.e., Uth1≤Udc≤Uth2, for a first preset time period T1, whether the direct current grid recovers is firstly determined. The system controller controls the medium-high voltage energy conversion system to be switched to the first direct circuit current source mode, and determines that the medium-high voltage energy conversion system operates in the first direct circuit current source mode.

If it is detected that the direct current voltage Udc is less than the first voltage threshold Uth1, i.e., Udc<Uth1, for a second time period T2, the system controller determines that the medium-high voltage energy conversion system cannot supply electric power to the present grid, and the system controller controls the medium-high voltage energy conversion system to be shut down.

In other cases than the above three cases, the system controller controls the medium-high voltage energy conversion system to operate in the direct current voltage source mode, and detects the direct current voltage at the overall direct current input port.

It can be seen that, in the case that the medium-high voltage energy conversion system provided in the present disclosure is in the normal operation state, the medium-high voltage energy conversion system, as a current source, is grid-connected to the direct current grid. In the case that the medium-high voltage energy conversion system is in the first fault state, the medium-high voltage energy conversion system, as a voltage source, can provide support for the direct current microgrid or grid.

Based on the above embodiments, a controller for a medium-high voltage energy conversion system is further provided according to an embodiment of the present disclosure. The medium-high voltage energy conversion system includes a DC/DC isolation circuit and a grid-connected circuit. The controller includes a first acquiring module, a first control module, a second control module, and a third control module.

The first acquiring module is configured to acquire an operation state of the medium-high voltage energy conversion system. The operation state includes a normal operation state and a fault state. The fault state includes a first fault state in which a direct current grid voltage drops and a second fault state in which a direct current grid voltage is in an overvoltage state.

The first control module is configured to: control the medium-high voltage energy conversion system to operate in a first direct circuit current source mode in a case that the medium-high voltage energy conversion system is in the normal operation state.

The second control module is configured to: control the medium-high voltage energy conversion system to operate in a direct current voltage source mode in a case that the medium-high voltage energy conversion system is in the first fault state.

The third control module is configured to: control the medium-high voltage energy conversion system to operate in a second direct circuit current source mode in a case that the medium-high voltage energy conversion system is in the second fault state.

The first acquiring module includes a first acquiring unit, a first determining unit, a second determining unit and a third determining unit.

The first acquiring unit is configured to acquire a direct current voltage at a direct current input port.

The first determining unit is configured to: determine that the medium-high voltage energy conversion system is in the first fault state, in a case that the direct current voltage is less than a first preset voltage threshold.

The second determining unit is configured to: determine that the medium-high voltage energy conversion system is in the normal operation state, in a case that the direct current voltage is greater than or equal to the first preset voltage threshold and is less than or equal to a second preset voltage threshold.

The third determining unit is configured to: determine that the medium-high voltage energy conversion system is in the second fault state, in a case that the direct current voltage is greater than the second preset voltage threshold.

The first control module is further configured to: in a case that the medium-high voltage energy conversion system is in the normal operation state, control an output voltage of the DC/DC isolation circuit to be equal to a first preset value and control the grid-connected circuit to operate in a constant current mode or a constant power mode.

The second control module is further configured to: in a case that the medium-high voltage energy conversion system is in the first fault state, control the direct current voltage at the direct current input port, control the output voltage of the DC/DC isolation circuit to be equal to a second preset value, and control a sum of input voltages of the grid-connected circuit to be 3N times the second preset value, where N is the number of cascade modules of one phase in the grid-connected circuit.

The third control module is further configured to: in a case that the medium-high voltage energy conversion system is in the second fault state, control the output voltage of the DC/DC isolation circuit to be equal to a third preset value and control the grid-connected circuit to operate in a constant current mode or a constant power mode.

The controller may further include a second acquiring module, a fourth control module, a fifth control module and a sixth control module.

The second acquiring module is configured to acquire a present direct current voltage at the direct current input port.

The fourth control module is configured to: switch the medium-high voltage energy conversion system to the second direct circuit current source mode, in a case that the present direct current voltage is greater than the second preset voltage threshold.

The fifth control module is configured to: switch the medium-high voltage energy conversion system to the first direct circuit current source mode, in a case that the present direct current voltage is greater than or equal to the first preset voltage threshold and is less than or equal to the second preset voltage threshold for a first preset time period.

The sixth control module is configured to: control the medium-high voltage energy conversion system to be shut down, in a case that the present direct current voltage is less than the first preset voltage threshold for a second preset time period.

An operation principle of the controller may refer to the above method embodiments, which is not repeated herein.

In summary, a control method for a medium-high voltage energy conversion system is provided in the present disclosure. In the control method, the operation state of the medium-high voltage energy conversion system is acquired. In a case that the medium-high voltage energy conversion system is in the normal operation state, the medium-high voltage energy conversion system is controlled to operate in the first direct circuit current source mode. In a case that the medium-high voltage energy conversion system is in the first fault state, the medium-high voltage energy conversion system is controlled to operate in the direct current voltage source mode. In a case that the medium-high voltage energy conversion system is in the second fault state, the medium-high voltage energy conversion system is controlled to operate in the second direct circuit current source mode. It can be seen that, in a case that the medium-high voltage energy conversion system provided in the present disclosure is in the normal operation state, the medium-high voltage energy conversion system operates in a direct circuit current source mode and is grid-connected to a direct current grid. In a case that a fault occurs in the medium-high voltage energy conversion system, the medium-high voltage energy conversion system operates in a direct current voltage source mode to provide support for direct current microgrid or grid.

The foregoing embodiments are only preferred embodiments of the present disclosure and are not meant to limit the present disclosure. The preferred embodiments according to the present disclosure are disclosed above, and are not intended to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence fall in the scope of the technical solutions of the present disclosure.

The invention claimed is:

1. A control method for a medium-high voltage energy conversion system, the medium-high voltage energy conversion system comprising a direct current-direct current (DC/DC) isolation circuit and a grid-connected circuit, the control method comprising:
- acquiring an operation state of the medium-high voltage energy conversion system, wherein the operation state comprises a normal operation state and a fault state, and the fault state comprises a first fault state in which a direct current grid voltage drops and a second fault state in which a direct current grid voltage is in an overvoltage state;
- controlling the medium-high voltage energy conversion system to operate in a first direct circuit current source mode in a case that the medium-high voltage energy conversion system is in the normal operation state;
- controlling the medium-high voltage energy conversion system to operate in a direct current voltage source mode in a case that the medium-high voltage energy conversion system is in the first fault state; and
- controlling the medium-high voltage energy conversion system to operate in a second direct circuit current source mode in a case that the medium-high voltage energy conversion system is in the second fault state, wherein
- the acquiring an operation state of the medium-high voltage energy conversion system comprises:
  - acquiring a direct current voltage at a direct current input port;
  - determining that the medium-high voltage energy conversion system is in the first fault state, in a case that the direct current voltage is less than a first preset voltage threshold,
  - determining that the medium-high voltage energy conversion system is in the normal operation state, in a case that the direct current voltage is greater than or equal to the first preset voltage threshold and is less than or equal to a second preset voltage threshold; and
  - determining that the medium-high voltage energy conversion system is in the second fault state, in a case that the direct current voltage is greater than the second preset voltage threshold.

2. The control method for a medium-high voltage energy conversion system according to claim 1, wherein
- in a case that the medium-high voltage energy conversion system is in the normal operation state, an output voltage of the DC/DC isolation circuit is controlled to be equal to a first preset value, and the grid-connected circuit is controlled to operate in a constant current mode or a constant power mode;
- in a case that the medium-high voltage energy conversion system is in the first fault state, the direct current voltage at the direct current input port is controlled, the output voltage of the DC/DC isolation circuit is controlled to be equal to a second preset value, and a sum of input voltages of the grid-connected circuit is controlled to be 3N times the second preset value, wherein N is the number of cascade modules of each phase in the grid-connected circuit; and
- in a case that the medium-high voltage energy conversion system is in the second fault state, the output voltage of the DC/DC isolation circuit is controlled to be equal to a third preset value, and the grid-connected circuit is controlled to operate in a constant current mode or a constant power mode.

3. The control method for a medium-high voltage energy conversion system according to claim 2, wherein after controlling the medium-high voltage energy conversion system to operate in the direct current voltage source mode, the control method further comprises:
- acquiring a present direct current voltage at the direct current input port;
- switching the medium-high voltage energy conversion system to the second direct circuit current source mode, in a case that the present direct current voltage is greater than the second preset voltage threshold;
- switching the medium-high voltage energy conversion system to the first direct circuit current source mode, in a case that the present direct current voltage is greater than or equal to the first preset voltage threshold and is less than or equal to the second preset voltage threshold for a first preset time period; and
- controlling the medium-high voltage energy conversion system to be shut down, in a case that the present direct current voltage is less than the first preset voltage threshold for a second preset time period.

4. A controller for a medium-high voltage energy conversion system, the medium-high voltage energy conversion system comprising a direct current-direct current (DC/DC) isolation circuit and a grid-connected circuit, the controller comprising:
- a first acquiring module configured to acquire an operation state of the medium-high voltage energy conversion system, wherein the operation state comprises a normal operation state and a fault state, and the fault state comprises a first fault state in which a direct current grid voltage drops and a second fault state in which a direct current grid voltage is in an overvoltage state;
- a first control module configured to: control the medium-high voltage energy conversion system to operate in a first direct circuit current source mode in a case that the medium-high voltage energy conversion system is in the normal operation state;
- a second control module configured to: control the medium-high voltage energy conversion system to operate in a direct current voltage source mode in a case that the medium-high voltage energy conversion system is in the first fault state; and
- a third control module configured to: control the medium-high voltage energy conversion system to operate in a second direct circuit current source mode in a case that the medium-high voltage energy conversion system is in the second fault state, wherein
- the first acquiring module comprises
  - a first acquiring unit configured to acquire a direct current voltage at a direct current input port,
  - a first determining unit configured to: determine that the medium-high voltage energy conversion system is in the first fault state, in a case that the direct current voltage is less than a first preset voltage threshold;
  - a second determining unit configured to: determine that the medium-high voltage energy conversion system is in the normal operation state, in a case that the direct current voltage is greater than or equal to the first preset voltage threshold and is less than or equal to a second preset voltage threshold; and
  - a third determining unit configured to: determine that the medium-high voltage energy conversion system is in the second fault state, in a case that the direct current voltage is greater than the second preset voltage threshold.

5. The controller for a medium-high voltage energy conversion system according to claim 4, wherein the first control module is further configured to: in a case that the medium-high voltage energy conversion system is in the normal operation state, control an output voltage of the DC/DC isolation circuit to be equal to a first preset value and control the grid-connected circuit to operate in a constant current mode or a constant power mode;

the second control module is further configured to: in a case that the medium-high voltage energy conversion system is in the first fault state, control the direct current voltage at the direct current input port, control the output voltage of the DC/DC isolation circuit to be equal to a second preset value, and control a sum of input voltages of the grid-connected circuit to be 3N times the second preset value, wherein N is the number of cascade modules of each phase in the grid-connected circuit; and the third control module is further configured to: in a case that the medium-high voltage energy conversion system is in the second fault state, control the output voltage of the DC/DC isolation circuit to be equal to a third preset value and control the grid-connected circuit to operate in a constant current mode or a constant power mode.

6. The controller for a medium-high voltage energy conversion system according to claim 5, the controller further comprising:

a second acquiring module configured to acquire a present direct current voltage at the direct current input port;

a fourth control module configured to: switch the medium-high voltage energy conversion system to the second direct circuit current source mode, in a case that the present direct current voltage is greater than the second preset voltage threshold;

a fifth control module configured to: switch the medium-high voltage energy conversion system to the first direct circuit current source mode, in a case that the present direct current voltage is greater than or equal to the first preset voltage threshold and is less than or equal to the second preset voltage threshold for a first preset time period; and a sixth control module configured to: control the medium-high voltage energy conversion system to be shut down, in a case that the present direct current voltage is less than the first preset voltage threshold for a second preset time period.

7. The controller for a medium-high voltage energy conversion system according to claim 4, wherein:

the direct current-direct current (DC/DC) isolation circuit comprises a plurality of DC/DC converters;

the grid-connected circuit comprises a plurality of cascade modules and an alternating current grid-connected filter, input ends of the plurality of DC/DC converters are connected in parallel with each other and are each connected to an input end of a direct current grid; and an output end of each of the plurality of DC/DC converters is connected in parallel with an input end of one of the plurality of cascade modules, and alternating current output ends of the plurality of cascade modules are connected in series with each other and are connected to an input end of an alternating current grid via the alternating current grid-connected filter.

8. The controller for a medium-high voltage energy conversion system according to claim 7, wherein each of the plurality of DC/DC converters is an LC series resonant converter, an LLC series resonant converter, a dual active DC/DC converter, a full-bridge DC/DC converter, a power bidirectional LC series resonant converter, or a power bidirectional LLC series resonant converter; and each of the plurality of cascade modules is a direct current-alternating current (DC/AC) converter.

* * * * *